Figure 1:
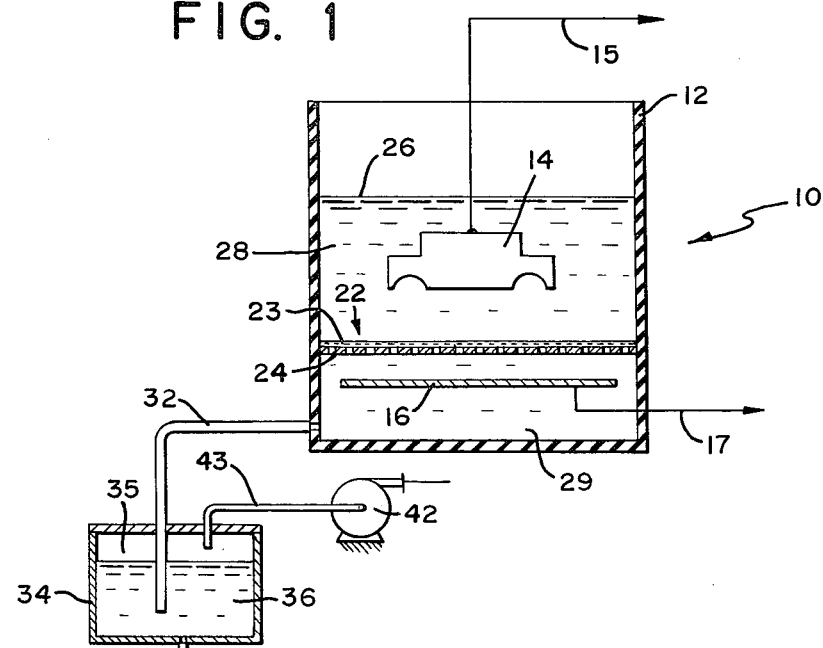

United States Patent [19]
Klinkowski

[11] 3,945,900
[45] Mar. 23, 1976

[54] ELECTRO ULTRAFILTRATION PROCESS AND APPARATUS

[75] Inventor: Peter R. Klinkowski, Norwalk, Conn.

[73] Assignee: Dorr-Oliver Incorporated, Stamford, Conn.

[22] Filed: Sept. 23, 1974

[21] Appl. No.: 508,409

Related U.S. Application Data

[63] Continuation-in-part of Ser. No. 249,701, May 2, 1972, abandoned.

[52] U.S. Cl. ...... 204/181; 204/299 EC; 204/300 EC
[51] Int. Cl.² .................. C25D 13/06; B01D 13/02
[58] Field of Search ........ 204/181, 300 EC, 299 EC

[56] References Cited
UNITED STATES PATENTS

| | | | |
|---|---|---|---|
| 3,663,397 | 5/1972 | Le Bras et al. | 204/181 |
| 3,730,866 | 5/1973 | Madejczyk | 204/181 |
| 3,784,460 | 1/1974 | Le Bras et al. | 204/181 |

FOREIGN PATENTS OR APPLICATIONS

| | | | |
|---|---|---|---|
| 1,020,910 | 2/1966 | United Kingdom | 204/299 EC |
| 1,117,461 | 6/1968 | United Kingdom | 204/181 |

*Primary Examiner*—Howard S. Williams
*Attorney, Agent, or Firm*—H. M. Snyder; Burtsell J. Kearns; Theodore M. Jablon

[57] ABSTRACT

An electro-ultrafiltration process is conducted in a tank in which the cathode and anode regions are separated by an anisotropic ultrafiltration membrane. A pressure differential is applied across the membrane and the fluid component of the bath moves through the membrane under the influence of this pressure for removal from the tank. Current applied between the electrodes develops an additional flow of the fluid component of the bath through the membrane. Due to the special characteristics of the anisotropic membrane, the total flux through the membrane under these conditions greatly exceeds the flux attributable to the individual effects of pressure and current. This process is especially useful when applied in electrophoretic coating systems, for it can establish a stable bath composition and it also tends to maintain the membrane in an essentially unfouled condition.

10 Claims, 4 Drawing Figures

ELECTRO ULTRAFILTRATION PROCESS AND APPARATUS

This application constitutes a continuation-in-part of application Ser. No. 249,701, filed May 2, 1972, now abandoned.

This invention relates to an electro-ultrafiltration process for separation of particulate matter from a fluid medium.

Most particulate matter when dispersed in fluids, is electrophoretic. Passing a current between electodes immersed in such a fluid will drive the particles to one of the electrodes thereby effectng a separation. The solids dispersed in clay slurries, sewage wastewater, proteinaceous suspensions such as cheese whey and polymeric electrocoating paints, have electrophoretic properties. The ultrafiltration process is a separation procedure which employs a differential pressure applied across a microporous membrane. The micropores of this membrane are of a size as to prevent passage of particles of high molecular weight (in general, particles of over 500 mw).

It is convenient to describe the present invention as it applies to plants for applying polymeric coatings. There are in commercial use electrophoretic coating installations in which an article to be coated is immersed as the anode in a bath containing charged polymeric paint resins in suspension or solution. The process has well-known advantages over conventional coating procedures such as spraying, dipping and the like. By means of this process, a relatively uniform coating can be applied to articles having complex configurations, including recessed areas; for example, automobile frames and bodies and tubular members. Wide use is made of the process in the automobile industry in the application of primers and paints for protecting such structures from corrosion.

It will be seen that in the operation of an electrophoretic deposition bath, the polymeric coating material is removed from the bath as the coating of articles proceeds, leaving behind the fluid or liquid medium which was initially associated with the coating material. Accordingly, the concentration of polymeric material will decrease in the course of the coating operations and, if nothing is done to replenish the supply of polymeric material or otherwise maintain its concentration in the bath, satisfactory operation of the coating process cannot long proceed. It has been found beneficial, therefore, to continuously remove and filter a portion of the bath, especially that portion of the bath which has become depleted of polymeric material. In the filtering process, commonly employing an ultrafiltration membrane, the polymeric material is separated from the fluid medium. The polymeric material can be fed directly back into the bath to maintain the desired concentration of coating material.

The fluid medium, which is the filrate in the electrophoretic coating process described above, contains impurities such as chromates, phosphates, chlorides and sulphates carried into the bath by one means or another; e.g., by the articles being coated. Such impurities increase bath conductivity, lower the bath throwing power and otherwise contaminate the bath and impede the process. When this fluid medium is removed from the bath as a filtrate, it may be wasted or treated for reuse. For example, the contaminated filtrate might be diluted with fresh fluid medium to a tolerable impurity level, mixed with polymeric material to achieve the desired concentration and then returned to the bath. One current practice is to waste a portion of the filtrate while the bulk is used to rinse the article being coated of non-deposited paint which is then returned to the bath.

The efficiency of the ulrafiltration membrane in removing the fluid medium, i.e. the flux rate, is usually expressed as a percent of the normal water flux. The normal water flux is measured at specified pressures on a feed of deionized water and is ordinarily considered the maximum flux that can be achieved by the membrane under test at the specified pressure. The water flux is the standard used because there are no retained or dissolved species to hinder flow.

One particularly successful ultrafiltration unit which has been applied in such a system employs an anisotropic, microporous, polymeric, high-flux, low-pressure membrane of the kind disclosed in U.S. Pat. No. 3,615,024, issued Oct. 26, 1971 in the name of A. S. Michaels. Ultrafiltration may also be carried out with cellulosic ultrafilters. In any case, the special membrane employed has a layered structure. An extremely thin layer, about one-tenth to about ten microns in thickness composed of a homogeneous polymer, is supported upon a thicker layer, about twenty microns to about one millimeter or more in thickness of a microporous open-celled polymer. Average pore diameter thickness, in the millimicron range; for example, from 1 to 1,000 millimicrons; i.e., about one-tenth to one-hundredth the thickness of the skin. By selection an ultrafiltration membrane having the appropriate pore size, the polymeric coating material can readily be separated from the fluid medium in an ultrafiltration unit. Electrodeposition tanks coupled with an ultrafiltration unit employing membranes of the type described, have operated on a commercial basis. However, after extended operation, the membranes of the ultrafiltration unit tend to become fouled with the electrophoretic polymeric material, thereby limiting flow of the filtrate through the membrane. Reliance is placed in these closed ultrafiltration units or cells upon the high velocity of the in-flowing stream to help limit film formation of polymeric material on the membrane and to reduce any material adhering to the membrane. Despite the fact that the ulrafiltration cells are thus to some extent self-cleaning, it is necessary from time to time either to remove the cells for a separate and special cleaning operation or to substitute clean cells for the fouled cells. Of course, it would be very distinctly advantageous if a process could be provided in which the ulrafiltration membrane would be completely self-cleaning or, better still, if a system could be provided in which such fouling films would not be deposited.

An electro-ultrafiltration system has now been invented with which an extraordinarily high flux rate can be achieved, in some cases higher even than the water flux rate. When the system is applied to the electrophoretic coating process, not only is bath composition maintained, but the ultrafiltration membrane will not require any substantial separate cleaning operation.

It is an object of the invention to provide an electro-ultrafiltration system having a high flux rate.

It is a further object of the invention to develop a flux rate in an electro-ultrafiltration process which can equal or even exceed the normal water flux rate of the membrane.

It is still another object of this invention to provide an operating electrophoretic deposition bath with a substantially constant concentration of polymeric coating material and constant low level of contaminants together with an ultrafiltration system which remains essentially unfouled in the deposition process.

It is yet another object of this invention to provide an ultrafiltration system for an electrodeposition process wherein fouling films are generally not deposited on the ultrafiltration membrane, but if deposited, are removed in the normal course of operation of the electrodeposition process.

Figure 2:
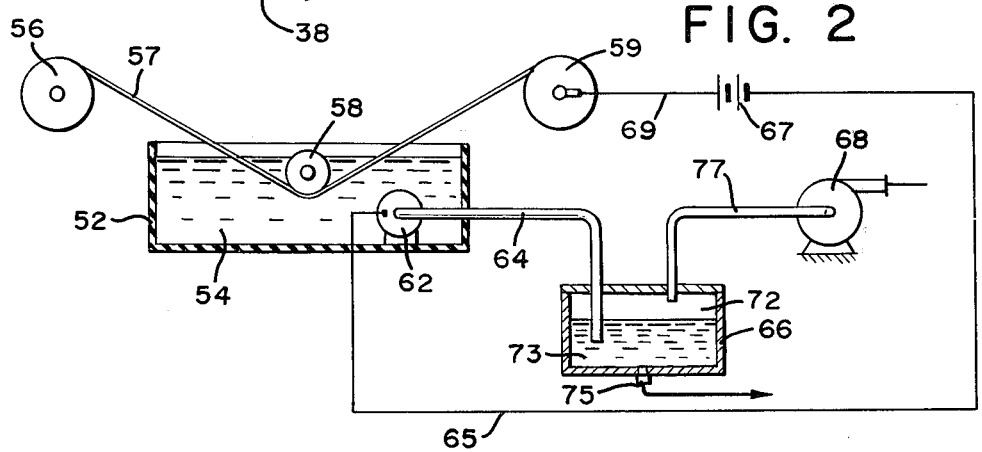
Figure 3:
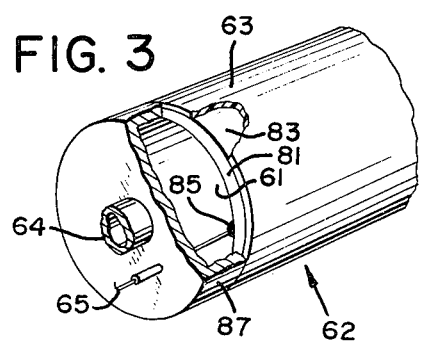
Figure 4:
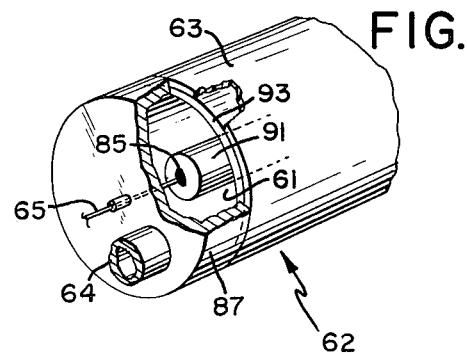
Figure 5:
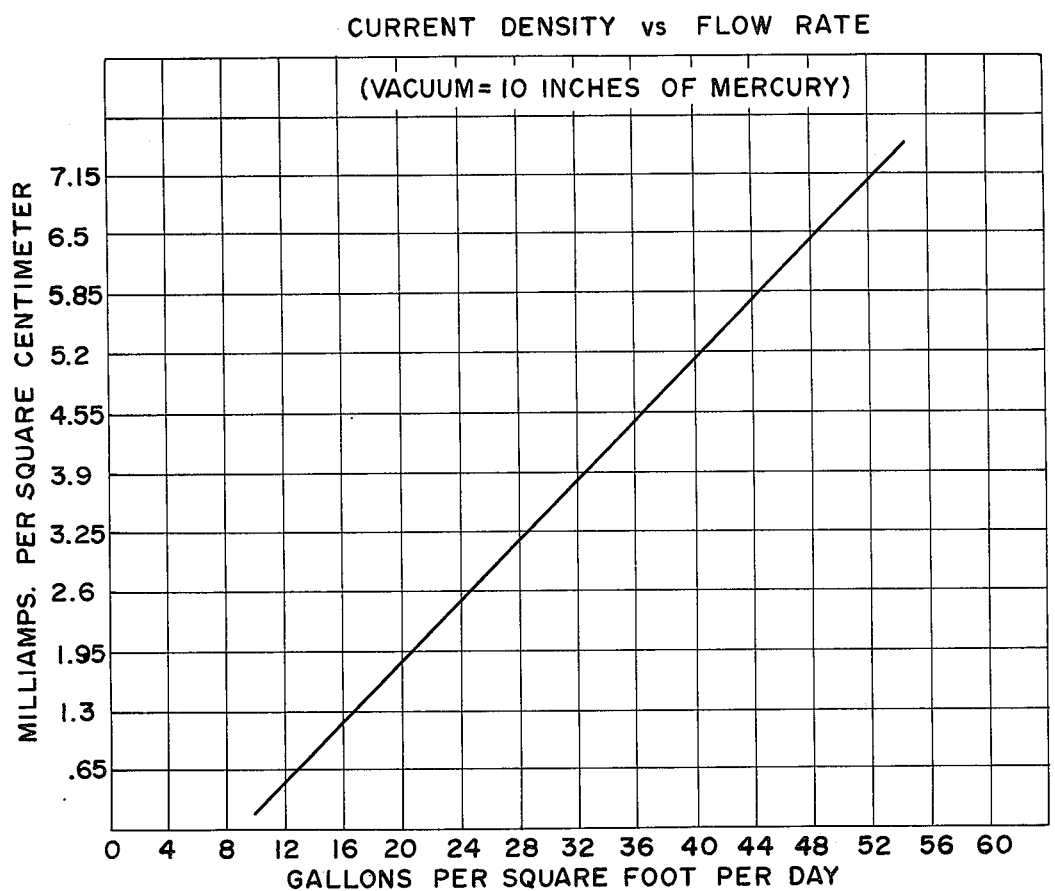

Other objects and advantages of the invention will become apparent from the following description taken in conjunction with the accompanying drawings in which:

FIG. 1 is a schematic showing of an electrophoretic deposition process in accordance with this invention, FIG. 2 is a schematic showing of another system for electrophoretic deposition in accordance with this invention, FIG. 3 is a broken perspective view of an electrode suitable for use in the process of the invention, FIG. 4 is a view similar to FIG. 3 of an alternative structure for an electrode, and FIG. 5 is a graph in which current density is plotted against flow rate in utilizing a membrane in accordance with the invention.

Generally speaking, the present invention contemplates an electro-ultrafiltration process in which a microporous, anisotropic, ultrafiltration membrane is utilized to separate anode and cathode chambers in the bath. As current is passed between the electrodes, traversing the membrane, the filterable particulate material in one chamber migrates toward the electrode therein for deposition or collection, while the fluid constituent of the bath moves through the membrane into the other electrode chamber. From this latter chamber excess fluid can be removed for disposal or reuse. Also, in accordance with the practice in ultrafiltration processes, a differential pressure is established and maintained across the membrane to effect a flow of fluid constituent through the membrane. It has been discovered, surprisingly, that the total flux obtained in this fashion invariably greatly exceeds the sum of the fluxes attributable to the individual effects of the pressure and current applied across the membrane. This remarkable phenomenon is apparently due to the characteristics of the microporous, anisotropic, ultrafiltration membrane.

In a more specific aspect, the present invention contemplates a process for the electrophoretic deposition of a polymeric coating material on an article in which the bath contains electrically charged polymeric material in a fluid (usually aqueous) medium. The article to be coated is made the anode in the bath and the cathode is isolated in the bath by a microporous ultrafiltration membrane which is substantially impermeable to the polymeric coating material, but through which the fluid medium can pass. The voltage gradient across the membrane causes the polymeric material in the anode region to deposit upon the anode while, at the same time, a flow of fluid medium which is directly proportional to the current density at the membrane passes into the cathode region. The fluid volume associated with the cathode is maintained at a lower pressure than the anode bath volume and, consequently, as the polymeric material is deposited on the articles to be coated and thereby removed from the bath at the anode, an additional flow of fluid medium passes into the cathode volume through the membrane under the influence of said pressure and is thereby removed from the anode bath volume. The fluid medium takes with it, through the membrane, ionic impurities which would otherwise accumulate in the anode bath. The anodic bath volume in which deposition is carried out is thus maintained with a substantially constant concentration of the polymeric coating material and a minimum of ionic impurities. The flux rate of fluid medium through the membrane can be controlled and raised to a level even higher than the water flux in some cases, by increasing the current density impressed upon the membrane.

In carrying the invention into practice, a tank for the electrophoretic deposition of polymeric coating material is provided with an anisotropic, microporous, polymeric, high-flux, low-pressure membrane which separates a main or anode bath volume of the tank from an enclosed cathode volume, and a pump means is provided for maintaining the cathodic volume at a lower pressure than the anode bath volume so that a flow is established through the membrane. The electrodeposition bath, as in the prior art, consists of a polymeric coating material suspended in an aqueous medium. Since the membrane separating the cathode volume from the anode volume is impermeable to the polymeric coating material, the flow through the membrane resulting from the pressure differential and the current density on the membrane will consist substantially entirely of the aqueous medium together with such impurities as may be dissolved in the bath. Further, the electrical potential between cathode and anode induces migration of polymeric particles in the bath toward the anode. Since substantially all of the polymeric material in the bath is disposed in the anode volume, the movement of particles located on or adjacent to the membrane is directed away from the membrane. The flux rate through the membrane is responsive to variations in current density impressed on the membrane. Increasing the current density increases the flux rate per unit membrane area proportionately.

The membrane thus provides a way for stabilizing the composition of the bath, since, with the polymeric coating material leaving the bath as a coating on the painted articles, the aqueous medium leaves the anode volume of the bath through the membrane and may then be pumped out of the tank. The amount of filtrate or aqueous medium withdrawn can be adjusted by the pressure differential employed and by the current density impressed on the membrane to more or less exactly balance the consumption of polymeric coating material, thereby stabilizing the bath composition. Also, since the movement of polymeric material is away from the membrane, the membrane tends to remain clean. The filtrate or fluid medium withdrawn from the bath may be used in washing coated articles, in pre-rinsing the articles to be coated, or it may be mixed with additional polymeric coating material and then used to replensih the bath, or the filrate may be wasted. In some cases the filtrate may be treated to remove impurities before it is reused in the process.

The bath compositions for electrodeposition are often characterized as being "solubilized", but, in fact, may be considered to be a complex solution, a dispersion, a suspension or a combination of one or more of these classes in water. These solubilized baths act as electrolytes for the passage of electric current. While the polymeric materials may, in some cases, or to some extent, be in solution, generally speaking the condition of the polymeric material is a dispersion of a molecular size lying somewhere between a colloidal suspension and a true solution.

Referring now to FIG. 1, there is disclosed therein an electrophoretic deposition system 10 for painting articles, which includes an electrodeposition tank 12 which is electrically insulated and contains a fluid indicated by the fluid level 26 which is made up of two fluid volumes separated by the filtering element 22. This filtering element 22 comprises an ultrafiltration membrane 23 which is sustained in position by the support member 24 which may be an insulating plastic perforate grid or screen. A first fluid volume in the electrodeposition tank 12 is composed of electrophoretic paint and fills the anode chamber 28 in which the electrodeposition process is carried out, whereas the second fluid volume occupies the cathode chamber 29 and is composed of a filtrate which is the aqueous medium component of the electrophoretic paint. Immersed in the paint in the anode chamber 28 is the anode member 14 (the article to be painted) connected to a DC power supply (not shown) by the electrical conductor 15. The cathode 16 is immersed in the aqueous medium of filtrate occupying cathode chamber 29 and it is connected to the DC power supply by the electrical conductor 17. The vacuum pump 42 is in communication with the gas volume 35 above the fluid 36 in the holding tank 34 through the conduit 43. The conduit 32 connects the filtrate chamber 29 of the electrodeposition tank 12 with the holding tank 34. A conduit 38 communicates with the holding tank 34 to permit withdrawal of fluid therefrom for disposal or further use.

In operation, an electrical potential is maintained between the cathode 16 and the anode 14 of sufficient magnitude to cause the negatively charged polymeric coating material in the fluid volume 28 to migrate to the anode 14 and thoroughly coat the electrode. The coated article or electrode 14 is then withdrawn from the bath, taking with it a substantial amount of the polymeric coating material. At the same time, a pressure differential is maintained across the filtering element 22 by the vacuum pump 42 by withdrawing fluid from the cathode chamber 29 through the conduit 32. The cathode chamber 29 is thereby maintained at a lower pressure than the anode chamber and, in consequence, a fluid flow is established through the membrane 23 of the filtering element 22. In addition, there is a component of the flux rate through the membrane which is due to the current density impressed on the membrane. Thus, the actual flux rate obtained is the result of the combined effects of pressure and current density at the membrane. Further, this combined flux rate is substantially greater than would be expected from mere summation of the flux rates due to each. Since the membrane 23 is substantially impermeable to the polymeric coating material in the electrophoretic paint, the fluid flow through the membrane consists almost entirely of the aqueous medium component of the electrophoretic paint. Some minor amount of electrophoretic material, say 10% or less, has a sufficiently small particle size so as to pass through the membrane 23 together with impurities in solution in the aqueous medium which the anode articles may bring into the bath. It wll be seen then that, in effect, both the polymeric coating material component and the aqueous medium component are being withdrawn from the electrodeposition tank 12, and by adjusting the operation of the vacuum pump and the current density on the membrane, the withdrawl of aqueous medium can be made to substantially exactly balance the withdrawl of polymeric coating material. The concentration of polymeric material in the electrophoretic paint is thus held essentially constant.

In the migration of polymeric coating material in the anode chamber 28 toward the anode 14 during the coating process, it will be noted from the arrangement in the electrodeposition tank 12 that this movement is directed away from the membrane 23 of the filtering element 22. Therefore, there is little or no tendency for a flow-choking film of polymeric coating material to form on the membrane 23 itself. In fact, the tendency is for the coating material to strip off the membrane 23 if any such film has formed.

Referring now to FIG. 2, another mode of utilizing the process of the invention is illustrated. An electrodeposition tank 52 contains an electrophoretic paint bath 54. A feed reel 56 carries a roll of metal sheet 57 which dips into bath 54 around guide roll 58 and thence to take-up reel 59. Immersed in bath 43 is a hollow cylindrical electrode 62 connected to a DC power source 67 by the electrical conductor 65. The metal sheet 57 is the other electrode in the bath 54 and is connected to the DC power source 67 through reel 59 by the electrical conductor 69. The exterior surface of the electrode 62 (see FIG. 3) is provided with an ultrafiltration membrane 63 and the chamber 61, interior of the electrode 62, is in fluid communication with the holding tank 66 through conduit 64. Vacuum pump 68 communicates with the gas volume 72 above the fluid 73 in tank 66 through conduit 77. The conduit 75 is connected to holding tank 66 as a drain.

The process, with the arrangement of FIG. 2, is carried out in a manner quite similar to that used with the arrangement of FIG. 1. Thus, the metal sheet 57 is the anode and moves through bath 54 to receive an electrodeposited coating of paint. The aqueous medium of the paint moves through the membrane 63 of the electrode 62 at rate determined by the pressure differential established by the vacuum pump 68 and the current density on the membrane and is withdrawn from the interior of the cathode through the conduit 64 to holding tank 66. The movement of electrophoretic polymeric material in bath 54 is away from the membrane 63 which therefore tends to remain clean.

The vacuum pumping means disclosed in the systems of FIGS. 1 and 2 may, of course, be replaced by direct acting pumps. In this case pumps would be inserted in conduit 32 of FIG. 1 and conduit 64 of FIG. 2. This would obviate the need for the sealed tanks 34 and 66 and the vacuum pumps 42 and 68. The pumps may be operated continuously or intermittently.

Some additional details of alternative cathode structures are illustrated in FIGS. 3 and 4. In FIG. 3, the cathode member 62 is tubular or cylindrical in form and is composed of a porous metal tube element 81 made, for example, by powder metallurgy techniques. The ulrafiltration membrane 63 is in contact with and completely envelops the exterior surface 83 of the porous metal member 81. It will be noted that the fluid medium of the electrophoretic paint gains access to the interior chamber 61 of the cathode member 62 by passing first through the pores of membrane 63 and then through the interstices of the powder metal tube element 81. An end closure or cap 87 is provided at each end of the cathode member 62 to seal the interior chamber 61. The electrical conductor 65 is connected to the metal tube element 81 of cathode member 62 at 85. The fluid conduit 64 communicates with the interior chamber 61 of the cathode member 62, passing through the end cap 87.

In FIG. 4, the cylindrical electrode 62 comprises a solid rodshaped carbon or metal element 91 supported in centrally spaced relation from the tubular grid member 93 which provides a perforate substrate as a base for the microporous membrane 63. Between the rod member 91 and the grid member 93 is the internal cathode chamber 61. The electrical conductor 65 is passed through end cap 87 and connected to the electrode element 91 at 85. Fluid conduit 64 also passes through end closure or cap 87 and is in communication with the internal cathode chamber 61.

In the structures shown in FIGS. 3 and 4 it is sometimes advantageous to interpose a porous base member, such as a layer of cardboard, between the ultrafiltration membrane 63 and either the tubular electrode member 81 or the grid member 93. Cardboard provides a good surface on which the membrane may be deposited and does not interfere with the ulrafiltration process.

It will be understood that the ultrafiltration membrane employed may be of the type described in the aforementioned U.S. Pat. No. 3,615,024. Since flow through the membrane is proportional to current density, it is preferable that the membrane is so positioned in the bath as to be perpendicular to the electrical field established, although other orientations are operable. The membrane may be composed, in accordance with the above patent, of polymers such as polycarbonates, polyvinylchlorides, polyamides, acrylic resins, polystyrene, styrene-acrylonitrile, polysulfones, acetal polymers and various copolymers. The average pore size in the thin surface layer of such a membrane may advantageously be in the range from 20 A to 100 A, but larger or smaler pore size may be desirable depending upon the size of the electrophoretic molecules. In generaI, the pore size in the thin surface layer will be from 0.1 to 0.001 of the layer thickness. Pore size in the support layer will be one or more orders of magnitude larger than in the surface layer. The membrane will sustain a very substantial flow of fluid therethrough, say from 5 to 100 gfd (gallons per square foot per day) or more. For example, a membrane having an average pore size in the range from about 20 A to about 50 A can easily sustain a flow volume in the range from about 20 to about 50 gfd with very effective filtration effect using only a moderate pressure differential across the membrane of up to about 15 lb/in$^2$ and a current density at the membrane of at least 10 ma/cm$^2$.

The formulation of polymeric materials for electrodeposition is a highly developed art and materials suitable for use in the bath of this invention are well known. Such polymeric materials are disclosed, for example, in U.S. Pat. No. 3,366,563 issued Jan. 30, 1968, U.S. Pat. No. 3,369,983 issued Feb. 20, 1968 and U.S. Pat. No. 3,403,088 issued Sept. 24, 1968.

The medium used to suspend the polymeric coating material has been referred to throughout as an aqueous medium, but it will be understood that the medium will in most cases contain, in addition to water, solubilizers or surfactants such as detergents, cellusolves, ketones and alcohols which are there for the purpose of maintaining the resins in suspension or solution. Again, this aspect of the paint compositions is well described in the patents mentioned in the preceding paragraph.

The electrophoretic paint will also contain pigments in addition to the polymeric resins and solubilizers, e.g., titanium dioxide, carbon black and iron oxide.

Coatings of acrylic and epoxy resins, for example, may be formed by the process of the invention.

For the purpose of illustrating the advantages of the invention to those skilled in the art, the following example is given:

EXAMPLE I

Using the system illustrated in FIG. 2, some preliminary tests are carried out to substantiate certain aspects of the invention. The porous metal tubular cathode element (of the type shown in FIG. 3) employed in this case is a stainless steel member, 10 inches long and 1.75 inches in diameter with a ⅛ inch wall thickness. It was prepared by powder metallurgy techniques and the voids therein amount to 30%, by volume. The membrane was formed on the tubular cathode element by dipping the element into a liqud bath comprised of a 15% solution of of a polyvinylchloride-vinylacetate-acrylonitrile terpolymer (sold under the trade designation NYGS) in dimethylformamide with 3% water, thereby providing an adherent membrane on the element which is about 8 mils in thickness having an average pore size of from about 30 A to about 35 A. The electrophoretic bath is a composition sold under the trade designation ED-2000, comprising 13% of a modified epoxy resin which is KOH-deficient, together with iron oxide and carbon black as pigments and with keto ethers and surfactants as dispersants.

With the roll mechanism and power supply shut down, the vacuum pump is operated to draw fluid from the interior chamber of the cathode into the holding tank. The fluid medium of the electrophoretic paint is drawn through the microporous membrane, but the electrophoretic material cannot pass through the membrane and accumulates on the surface thereof. The accumulation of electrophoretic material on the surface of the membrane gradually chokes off the flow of fluid medium and from an initial flow rate of about 10 gfd, the rate diminishes to very nearly a zero flow rate. The power is then turned on to establish a voltage gradient between the cathode 62 and the sheet anode 57 and the flow rate is measured as the current density is increased. The electrophoretic material in the bath migrates toward the anode, and significantly, as the current density increases, the electrophoretic film on the cathode is thinned and greatly depleted by migration of the material toward the anode, and a high rate of flow through the membrane is re-established. Flow through the membrane is proportional to current density and therefore proportional to the deposition rate. It is found that at the higher current densities, e.g., 6.5 ma/cm$^2$ (milliamperes per square centimeter), flow rates of as high as 50 gfd and even higher can be attained. The results obtained as just described are set forth in graphical form in FIG. 5. It should be understood that the flow rate cannot improve indefinitely as the slope of the curve would indicate, but that at some value of current density higher than that used in this series of tests, the flow rate will become constant as the film on the membrane is substantially entirely removed. The high flow rates obtained in these tests contrast with results obtained with filtration cells now in commercial use which are subject to deposition of flow-inhibiting films. Flow rates in the range of only about 8 to 18 gfd are experienced in such installations. It is clear, then, that with the arrangement and process of the invention, the microporous membrane can be maintained essentially clear of flow-obstructing films in an electrophoretic bath and that the flow rate is determined by the pressure differential across the membrane and the current density impressed on the membrane.

The system of FIG. 2 was employed to deposit a coating of electrophoretic paint on a sheet of aluminum foil 0.002 in. in thickness which was passed through the bath from feed reel 56 to take-up reel 59. The bath was agitated by a magnetic stirrer (not shown). The sheet moved through the bath at a speed of 5 feet per minute. Both sides of the foil were uniformly coated with an adherent film of paint to a thickness of 2 mils. A flow of 60 gfd of the fluid medium of the electrophoretic paint was maintained through the microporous membrane throughout the painting process by a pressure of about 5 lb/in$^2$ and a current density of about 8.4 ma/cm$^2$. The normal water flux rate at 5 lb/in$^2$ is about 14 gfd. The concentration of electrophoretic material remained substantially constant in the bath as determined by monitoring analyses during the process. No significant amount of electrophoretic material was deposited on the microporous membrane during the painting operation as is indicated by the fact that the high flow rate through the membrane remainded substantially constant.

The effect of current density at the membrane on the flux rate was examined in some detail as is set forth in the following examples.

EXAMPLE II

A 0.2 sq. ft. membrane was prepared by casting on the outside of a porous caardboard tube the solution, as described in Example I, and precipitating in water containing 3% Triton X-100. A ½-inch carbon rod was inserted inside the tubular membrane and connected to a power supply. Appropriate fittings were connected to the membrane device to set up the system illustrated in FIG. 2.

With no power applied, the water flux of the membrane was measured at different pressures.

| Pressure (inches of Hg vacuum) | Water Flux (gfd) |
|---|---|
| 20 | 26 |
| 15 | 20.5 |
| 10 | 13.4 |

Over the pressure range tested, water flux varied linearly with the pressure applied.

With no power applied, the system was run on the electrophoretic bath composition described in Example I. At 15 inches Hg vacuum, the initial flux was 12 gfd which dropped to 0 gfd after only several minutes of operation. The application of power on clean membranes resulted in the following stable flux rates:

| Current (Amps) | Current Density (ma/cm$^2$) | Flux (gfd) |
|---|---|---|
| 0.7 | 3.8 | 11.7 |
| 1.0 | 5.4 | 16.55 |
| 1.4 | 7.6 | 19.2 |
| 1.8 | 9.7 | 25.5 |
| 1.9 | 10.2 | 27.5 |

It will be noted that with a current density of 9.7 ma/cm$^2$ and at a pressure of 15 inches Hg vacuum, the stable flux rate attained operating with electrophoretic paint substantialy *exceeded* the *water flux rate* at that pressure. Increasing the current density to 10.2 ma/cm$^2$ resulted in an even higher stable flux rate. The expected flux rate of the permeate would be about two-thirds that of the water flux rate.

In order to achieve higher current densities, the bottom half of the tubular membrane device was rendered impervious to fluid and electric current with insulating tape. Flux rates were stable at the following points with 15 inches of vacuum.

| Current (Amps) | Current Density (ma/cm$^2$) | Flux (gfd) |
|---|---|---|
| 1.6 | 17.25 | 39.2 |
| 1.8 | 19.4 | 45.5 |
| 3.2 | 34.4 | 69.7 |
| 3.8 | 41 | 85.0 |

With pressure held constant, a linear relationship has thus been demonstrated between the current density and the flux over the current density range tested.

After 27 hours of operating in paint, the membrane device was then removed from the bath, cleaned carefully and tested for any change in water flux. At 15 inches Hg, its water flux was 16.7 gfd. The slight drop from the original of 20.5 gfd is presumed to be due to incomplete cleaning. This is supported by the fact that after soaking for several hours in water with a few drops of diethylamine, the flux was again measured at 18.2 gfd. The most remarkable and entirely unexpected result of this experiment was the discovery that in the electrophoretic application of anisotropic membrane devices where the current is applied across the membrane, operating flux can be in excess of the normal water flux. This means that aside from the predictable removal of any fouling film accomplished by application of the electric current, there is, in addition, some mechanism which causes significant accelerated transport of the fluid medium. To study this further, flux rates were measured with current, at 15 inches Hg vacuum, on a deionized water-diethylamine system (only a trace amount of diethylene is added to make the water conductive) and the same tubular membrane:

| Current (Amps) | Flux (gfd) |
|---|---|
| 0 | 18.2 |
| 0.2 | 66.7 |
| 0.5 | 100 |
| 1.0 | 134 |

In a similar KOH-water system, the same membrane gave 200 gfd at 0.8 amp and 15 inches Hg vacuum. One would anticipate that if trace amounts of KOH or diethylamine in water could cause such a dramatic effect on the water transport, larger quantities of KOH or diethylamine would yield even greater effects. Experimental evidence, however, showed that, as the ionic strength of the solution increased, it reached a point where not only was there no net increase in mass transfer, but instead the flux reverted to the same rate as was achieved with no power applied.

Thus, the following table has been prepared from these experiments:

|  | $10^{-4}$N KOH | $10^{-1}$N KOH |
| --- | --- | --- |
| flux at 0 amps | 18 gfd | 18 gfd |
| flux at 1 amp | 200 gfd | 18 gfd |

While it is not the intent to be bound by any particular explanation of the phenomena which have been described above, since there are other possible explanations which ultimately may prove to be valid, it is presently believed that the unexpected increase in transport through the membrane relates to ionic solutions whose DeBye length is large with respect to the pore length. The DeBye length as used herein is defined as the diameter of the electric field which exists about an ion. Indeed, it is the extremely short pore length of the anisotropic membranes that distinguishes them from other membrane or semi-permeable devices which have been used similarly without experiencing the accelerated transport. When the thin skin of the anisotropic membrane is less than about 90 A in paint, the DeBye length of the ions in solution is longer than the pore length in the skin and a "streaming" of positively charged ions through the pores is achieved.

EXAMPLE III

A cellulose acetate ulrafiltration membrane of the anisotropic type was cast on a cardboard tube according to the art. The effective membrane area was 0.1 sq. ft. and it was applied into the system described in FIG. 2 and operated on deionized water-diethylamine feed with and without application of current and then operated on electrophoretic paint feed with and without current.

| Pressure (inches of Hg vacuum) | Water Flux (gfd) |
| --- | --- |
| 10 | 21.2 |
| 15 | 30.6 |
| 20 | 38.1 |

At 15 inches of Hg vacuum:

| Current (Amps) | Current Density (ma/cm$^2$) | Water Flux (gfd) |
| --- | --- | --- |
| 0 | — | 30.6 |
| 0.3 | 3.2 | 37.5 |
| 0.6 | 6.4 | 50.0 |
| 1.0 | 10.8 | 60.0 |
| 1.5 | 16.1 | 51.0 |

On ED-2000 electrophoretic paint — 15 inches of Hg vacuum:

| Current (Amps) | Current Density (ma/cm$^2$) | Flux (gfd) |
| --- | --- | --- |
| 0 | — | 0 |
| 1.2 | 12.9 | 26.8 |
| 2.0 | 21.6 | 34.6 |
| 2.7 | 29.1 | 50.5 |
| 4.0 | 43.2 | 73.5 |
| 4.7 | 50.5 | 90.8 |

It will be noted from the above results that an anisotropic cellulose acetate ultrafiltration membrane exhibits the same improved flux rates when current is applied as were observed with respect to the anisotropic polyvinylchloride-vinylacetate-acrylonitrile terpolymer ulrafiltration membrane of Example I. Thus, it is seen that the water flux rate at 15 inches of mercury vacuum can be nearly doubled by applying a current density of 10.8 ma/cm$^2$. This doubled flux can be exceeded, even though the system is operating on electrophoretic paint, as the current density approaches 40 ma/cm$^2$.

EXAMPLE IV

Three anisotropic membranes, of the types indicated below, were cast on the outside of porous polypropylene tubes according to the art. The tubes were assembled as in FIG. 2 by insertion of carbon rods as in Example II. Each membrane was 0.082 sq. ft. Flux characteristics were determined on each one.

XP-24 membrane (polyvinylchloride-vinyledene chloride, acrylonitrile terpolymer) (24,000 mw cut off):
No Current:

| Pressure (inches of Hg vacuum) | Water Flux (gfd) |
| --- | --- |
| 10 | 116 |
| 15 | 193 |
| 20 | 279 |

With Current at 15'' Hg:

| Current (Amps) | Current Density (ma/cm$^2$) | Water Flux (gfd) |
| --- | --- | --- |
| 0 | — | 174 |
| 0.5 | 6.6 | 279 |
| 1.0 | 13.1 | 350 |
| 1.5 | 19.7 | 420 |

On ED-2000 electrophoretic paint:

| Current (Amps) | Current Density (ma/cm$^2$) | Flux (gfd) |
| --- | --- | --- |
| 0 | — | 0 |
| 1.2 | 15.8 | 39 |
| 1.75 | 23 | 45.7 |
| 2.10 | 27.6 | 58.41 |
| 2.36 | 31 | 62.78 |
| 2.62 | 34.4 | 72.44 |
| 3.82 | 50.1 | 84.6 |

IP-3 (Polyarylsulphone) membrane (3,000 mw cut off):
Water flux - no current:

| Pressure (inches of Hg vacuum) | Water Flux (gfd) |
| --- | --- |
| 10 | 155 |
| 15 | 232 |
| 20 | 284 |

ED-2000 electrophoretic paint at 15'' Hg:

| Current (Amps) | Current Density (ma/cm$^2$) | Flux (gfd) |
| --- | --- | --- |
| 0.67 | 8.8 | 17.6 |
| 1.2 | 15.8 | 28.9 |
| 2.05 | 26.9 | 38.8 |
| 2.85 | 37.4 | 59.64 |
| 3.56 | 46.7 | 71.2 |
| 5.5 | 72.2 | 115.6 |

XP-24 low viscosity (very thin) membrane:
No current - water flux:

| Pressure (inches of Hg vacuum) | Water Flux (gfd) |
| --- | --- |
| 10 | 25 |
| 15 | 34.6 |
| 20 | 45 |

Water flux with current at 15'' Hg:

| Current (Amps) | Current Density (ma/cm$^2$) | Water Flux (gfd) |
| --- | --- | --- |
| 0 | — | 35 |
| 0.25 | 3.3 | 64 |
| 0.35 | 4.6 | 210 |
| 0.55 | 7.2 | 300 |

Flux on ED-2000 at 15'' Hg:

| Current (Amps) | Current Density (ma/cm$^2$) | Flux (gfd) |
| --- | --- | --- |
| 0 | — | 0 |
| 1.1 | 14.4 | 29.6 |

-continued

XP-24 membrane (polyvinylchloride-vinyledene
chloride, acrylonitrile
terpolymer) (24,000 mw cut off):
No Current:

| Pressure (inches of Hg vacuum) | | Water Flux (gfd) |
|---|---|---|
| 2.0 | 26.3 | 45.4 |
| 2.56 | 33.6 | 63.4 |
| 2.94 | 38.6 | 95.8 |

The results obtained with these three membranes demonstrate the remarkable increase in flux which is obtained by application of current across the membrane.

EXAMPLE V

In order to demonstrate the synergistic effect obtained, in accordance with this invention, by the simultaneous application of both pressure and current across the anisotropic membrane, the water flux was determined on a 0.003 M solution of sodium bicarbonate with (1) pressure alone applied, (2) current alone applied and (3) both pressure and current applied. The results were as follows:

| Pressure (inches of Hg vacuum) | Current (Amps) | Flux (gfd) |
|---|---|---|
| 25 | 0 | 189 |
| 0 | 1 | 60 |
| 25 | 1 | 331 |

It is seen that the effects of simultaneous application of pressure and current, across an anisotropic membrane, are not merely additive, but the actual water flux obtained in this instance exceeds the sum of the two effects by more than 30%.

The anisotropic membrane of U.S. Pat. No. 3,615,024, mentioned above, would exhibit a water flux of 15 – 25 gfd on pure distilled water at a 15 psi pressure drop. Such an anisotropic membrane would have an 8 – 10 gfd flux when used (with no current across the membrane) in the treatment of an electrodeposition bath as described in U.S. Pat. No. 3,663,404, which issued May 16, 1972. Used in accordance with this application, the anisotropic membrane could sustain flux rates in excess of 150 gfd at the same pressure differential. Flux is independent of pressure when operated at at least about a 5 psi differential.

The power consumption to produce 1,000 gallons of permeate from an anisotropic ultrafiltration membrane used in accordance with U.S. Pat. No. 3,663,404 would be about 60 kilowatt hours. This power is necessarily consumed in passing the feed along the membrane surface at a sufficient velocity to minimize the secondary film buildup and sustain a steady state flux. When that same membrane is used in accordance with this invention, the same quantity of permeate could be generated with only 6 kilowatt hours, because the fouling films are prevented by the electrode-membrane arrangement.

The discovery that the membrane flux is proportional to the current density, independent of the membrane area and a function of the area of the object undergoing electropainting, makes it relatively simple to achieve automatic tank control. This automatic tank control would operate in the following manner in the electropainting of automobile bodies, for example: The automobile bodies would move through the paint bath at a fixed rate to receive a coating of paint. The voltage would be set at some value which will produce the electrical current required to deposit a paint coating of desired quality on the automobile bodies. The membrane flux is constant, maintaining the paint bath concentration at a predetermined level. When it is desired to increase the rate at which the automobile bodies are painted, and hence a greater area for painting is moved into the bath in a given time period, the voltage is maintained constant with a consequent increase in the current, whereby the desired coating quality is maintained. The increase in current, of course, results in an increase in current density at the membrane and a consequent increase in the flux. The increase in flux tends to stabilize the composition of the paint bath.

In the above description, it has been indicated that the deposition of coating material occurs at the anode. However, the invention is equally applicable in the situation where the polarity of the electrodes is reversed; i.e., where the article to be coated is made the cathode, to which positively charged polymeric material is attracted, and the fluid medium of the electrophoretic paint is removed as a filtrate through the anode chamber.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. In a process for electrophoretic deposition of a coating on a first electrode from a bath containing polymeric coating material disposed in a fluid medium wherein an ulrafiltration process is employed to maintain the concentration of polymeric coating material in the bath at a substantially constant level while deposition proceeds, the improvement whereby a polymeric anisotropic ulrafiltration membrane is maintained in a substantially clean and unfouled condition and functions to remove excess fluid medium and contaminants from the bath, comprising, subjecting said bath to the ultrafiltration process proximate a second electrode which is isolated from the main bath volume by said anisotropic ultrafiltration membrane and thereby establishing and maintaining a volume of ulrafiltrate depleted in polymeric material at said second electrode, said volume of ultrafiltrate being closed off from the atmosphere, withdrawing ultrafiltrate from said volume established at said second electrode to maintain a pressure differential of at least about 5 psi across said anisotropic membrane and a first flow increment of fluid medium from said bath through said anisotropic membrane, energizing the electrodes to establish an electrical current traversing said anisotropic membrane for electrophoretic deposition of said polymeric material, thereby inducing migration of said polymeric material in said main bath volume and, particularly, in the region adjacent said membrane, toward said first electrode essentially in counterflow to the flow of fluid medium through said anisotropic membrane whereby said membrane is maintained in a substantially unfouled condition, said current inducing a second flow increment of fluid from said main bath volume of ultrafiltrate at said second electrode, the total flow of fluid medium through said membrane being directly proportional to the current applied and the total flow through the membrane being substantially greater than the sum of the flows individually attributable to the effects of pressure and current.

2. A process for separating particulate material from a fluid medium in which it is disposed, comprising, establishing a bath volume isolated from a main bath volume by an anisotropic microporous ultrafiltration membrane, maintaining a differential pressure across said membrane capable of supporting a predetermined first flow rate of said fluid medium through said membrane into said isolated bath volume, locating a first electrode in the main bath volume and a second electrode in said isolated bath volume, passing a current through said anisotropic membrane to effect deposition of said particulate material at said first electrode, said current being independently capable of supporting a second predetermined flow rate of said fluid medium through said anisotropic membrane into said isolated bath volume, and the total flow of fluid medium through said membrane into said isolated bath volume exceeding the sum of the flows individually attributable to the pressure and current applied.

3. The process of claim 2 wherein the differential pressure across said membrane is at least about 5 psi.

4. A bath control method for anodic electrophoretic deposition on anodic surface areas wherein current is passed through the bath to deposit electrophoretic material on one or more recipient anodes which move into, through and out of the bath, comprising, locating at least one cathode in contact with an enclosed pressure-tight bath volume isolated from the main bath volume by an anisotropic ultrafiltration membrane, establishing a pressure differential of at least about 5 psi across the membrane to initiate a first flow component of ultrafiltrate through the membrane, passing a current between said cathode and said recipient anodes to effect electrodeposition upon said recipient anodes and to initiate a second flow component of ultrafiltrate through the membrane which is directly proportional to the current density on the membrane, maintaining a constant voltage between said electrodes thereby assuring a constant deposition rate per unit area and a second flow component of ultrafiltrate which varies in direct relation to the depletion of solids from the bath and proportionally to the changes in surface area of the anode, the total flow of ultrafiltrate through said membrane substantially exceeding the sum of the flows individually attributable to the pressure and current applied.

5. An ultrafiltration system for treating a filterable fluid medium which is capable of attaining accelerated transport of filtrate through an anisotropic ulrafiltration membrane, comprising, a vessel having two chambers separated by said anisotropic ultrafiltration membrane, one of said chambers being open to the atmosphere and the other closed to the atmosphere, said anisotropic ultrafiltration membrane comprising a thin skin of from about 0.1 to 5 microns in thickness having an average pore diameter of from about 1 to 1,000 millimicrons on a coarsely porous support layer, means for establishing a pressure differential between said chambers across said anisotropic membrane wherein the fluid at higher pressure bears on the skin surface of said membrane and is capable of forcing filtrate through said membrane at a first flow rate, an electrode in each of said chambers adapted to be immersed in the fluid therein, means for establishing an electrical potential between said electrodes to thereby initiate a flow of electrical current between said electrodes across said membrane, said current flow being capable of initiating a flow of fluid at a second flow rate through said membrane which is supplementary to said fluid flow generated by said pressure differential, the total fluid flow rate through said anisotropic membrane when both pressure and current are applied being substantialy in excess of the sum of the fluid flow rates individually attributable to said pressure differential and said current.

6. The system of claim 5 wherein the electrode in said closed chamber is the cathode and wherein an extraction pump is provided to establish a pressure differential of at least about 5 psi across said membrane.

7. The system of claim 5 wherein the electrode in said closed chamber is the anode and wherein an extraction pump is provided to establish a pressure differential of at least about 5 psi across said membrane.

8. The system of claim 5 wherein said electrode in said open chamber is adapted to make electrical contact with a D.C. power supply and comprises a plurality of conductive members movable into, through and out of said open chamber for deposition of a polymeric coating material thereon.

9. The ultrafiltration system of claim 5 wherein one of said electrodes comprises a porous tubular metal member, the internal chamber of said tubular member being sealed and thus constituting the closed chamber of said vessel, the ultrafiltration membrane being in contact with and enveloping the exterior surface of said tubular metal member, the tubular member being connected through an electrical conductor to an external source of power and a fluid conduit connecting the internal chamber of the tubular member with external means for withdrawing fluid from said internal chamber.

10. The ultrafiltration system of claim 5 wherein one of said electrodes comprises a carbon or metal rod member axially disposed of a tubular filtering element which is comprised of a perforate support member on which is disposed the ultrafiltration membrane, the volume defined between the said rod member and the tubular filtering element providing a sealed annular chamber constituting the closed chamber of said vessel, the rod member being connected thrugh an electrical conductor to an external source of power and a fluid conduit connecting the said annular chamber with external means for withdrawing fluid from said chamber.

* * * * *